US006950801B2

(12) United States Patent
Brookes et al.

(10) Patent No.: US 6,950,801 B2
(45) Date of Patent: Sep. 27, 2005

(54) METHOD AND APPARATUS FOR COORDINATING SERVICES

(75) Inventors: Robert Brookes, Gibsonia, PA (US); Mark A. Homison, Glenshaw, PA (US); Lisa S. Langford, Allison Park, PA (US); James V. Latch, Gibsonia, PA (US); Thomas S. Molenda, Pittsburgh, PA (US); Christopher W. Umble, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 411 days.

(21) Appl. No.: 09/618,809

(22) Filed: Jul. 18, 2000

(65) Prior Publication Data

US 2003/0014295 A1 Jan. 16, 2003

Related U.S. Application Data

(60) Provisional application No. 60/146,039, filed on Jul. 28, 1999.

(51) Int. Cl.$^7$ .............................................. G06F 17/60
(52) U.S. Cl. ................................. 705/7; 705/8; 705/9
(58) Field of Search .............................. 705/7, 8, 9, 10, 705/4, 14, 1, 5; 395/202, 329; 707/660; 380/25

(56) References Cited

U.S. PATENT DOCUMENTS

| | | | | |
|---|---|---|---|---|
| 5,432,904 | A | | 7/1995 | Wong ........................... 395/161 |
| 5,504,674 | A | | 4/1996 | Chen et al. ................... 364/401 |
| 5,583,763 | A | * | 12/1996 | Atcheson et al. ............... 707/3 |
| 5,652,842 | A | * | 7/1997 | Siegrist et al. .................. 705/2 |
| 5,794,207 | A | | 8/1998 | Walker et al. ................. 705/23 |
| 5,797,127 | A | | 8/1998 | Walker et al. .................. 705/5 |
| 5,842,178 | A | * | 11/1998 | Giovannoli .................... 705/26 |
| 5,862,223 | A | | 1/1999 | Walker et al. ................. 380/25 |
| 5,884,272 | A | | 3/1999 | Walker et al. .................. 705/1 |
| 5,950,169 | A | * | 9/1999 | Borghesi et al. ............... 705/4 |
| 6,282,251 | B1 | * | 8/2001 | Worstell ...................... 375/341 |
| 6,314,406 | B1 | * | 11/2001 | O'Hagan et al. .............. 705/14 |
| 6,356,909 | B1 | * | 3/2002 | Spencer ....................... 707/10 |
| 6,397,197 | B1 | * | 5/2002 | Gindlesperger ............... 705/37 |

FOREIGN PATENT DOCUMENTS

| WO | WO 9526535 A1 | * | 10/1995 | ........... G06F/17/60 |
|---|---|---|---|---|
| WO | WO00072207 A1 | * | 11/2000 | ........... G06F/17/60 |

OTHER PUBLICATIONS

Corporate News "PPG Receives CIO Award For IT Application In Forming Business" discloses a consumer resolving a glass replacement or repair claim with a brief telephone call.*
Kalakota, Ravi and Whinston, Andrew B, "Electronic Commerce A Manager's Guide", puiblished in 1997.*
www.safelite.com as archived Jun. 20, 2003—Windshield glass replacement service.*
cartalk.cars.com as archived on Jul. 7, 2000—Web site on automobile repairs.*

* cited by examiner

*Primary Examiner*—Romain Jeanty
(74) *Attorney, Agent, or Firm*—Dennis G. Millman

(57) ABSTRACT

The invention relates to a method of coordinating or arranging services, such as automotive glass repair services for the policyholders of an insurance company, and to an apparatus for practicing the method. The method includes providing a database of service providers, obtaining service need information regarding a customer, selecting at least a portion of the service providers in the database based on the service need information, ranking the selected service providers, and choosing one of the ranked service providers to perform the service.

6 Claims, 5 Drawing Sheets

METHOD AND APPARATUS FOR COORDINATING SERVICES

CROSS-REFERENCE TO RELATED APPLICATION

This application claims the benefits of U.S. Provisional Application No. 60/146,039, filed Jul. 28, 1999, which is herein incorporated by reference.

BACKGROUND OF THE INVENTION

1. Field of the Invention

This invention relates generally to a method and apparatus for coordinating or arranging for services and, in one particular embodiment, to a method and apparatus for coordinating or arranging automotive glass repair services for a policyholder of an insurance company.

2. Technical Considerations

In many commercial fields, the service or parts providers for a particular field present a fragmented array of individual providers where individual customers may not have an organized approach to obtaining the best services or parts at an acceptable price. An example of such a field is the current automotive glass repair service industry.

In the field of automotive glass repair, individual glass repair shops typically receive work directly from the policyholder (customer) of an insurance company or through the local insurance agent or regional claims adjuster for the insurance company of the policyholder. After the work is completed, the repair shop sends an invoice to the insurance company or designated agent for payment and the insurance company remits payment to the repair shop. However, there are drawbacks associated with this conventional method. For example, the insurance company typically may negotiate discount prices with each repair shop individually and all repair shops may not be willing to give similar discounts. Improvements in reducing this time and effort for negotiation could reduce policy costs for the policyholder. Also, much time is spent by the insurance company in auditing the invoices from the glass repair shops. It is not unusual for many of the invoices received by an insurance company to have one or more errors, such as incorrect prices or incorrect part numbers. This conventional invoice review system is quite burdensome to most insurance companies. Reducing the time involved in checking and/or correcting the invoices could also help reduce policy costs, which would be beneficial to the policyholder.

As an alternative to this conventional method, glass repair middlemen evolved to help coordinate glass repairs. These middlemen typically own a number of glass repair shops. A middleman contracts with an insurance company to repair or replace automotive glass loss for that insurance company's policyholders at a discount from a conventionally accepted price. The repair shops then do the repair work at a larger discount and bill the middleman at this more highly discounted rate. The middleman then bills the insurance company at the previously agreed upon discounted price and pockets the difference between what the repair shop billed and what the insurance company paid. These middlemen typically conduct this service at no fee to the insurance company since they are compensated by the discount difference between what they charge the insurance company and what the repair shop charges the middleman.

In addition to repair shops directly owned by the middleman, the middleman may also contract with independent glass repair shops willing to do glass repair work for a discount for the insurance company. Some independent repair shops agree to such a discounting procedure simply to receive the repair work. However, this system is not advantageous to the independent glass repair shops because it is time consuming and does not enable the repair shops to maximize their efficiency. Since the middleman's profit is dependent upon the discount at which the repair shops are willing to work, the independent repair shops are also under constant pressure from the middleman to decrease their prices. Further, the middleman is inclined to direct most of the work to the shops he owns and over which he has the most control to further maximize his profits. Also, the independent glass repair shops in this system are not working directly for the insurance company but are rather working for the middleman who, in reality, is actually one of their competitors. This system is also not advantageous to the insurance company or its policyholders since the true extent of the discount offered by the repair shops is not passed on to the insurance company or its policyholders but rather a large portion is kept by the middleman as profit.

Another exemplary fragmented commercial field is the home repair field. Individual home repair service providers may receive work from various customers, such as, for example, insurance company policyholders, insurance agents, insurance companies, or from individuals seeking to have home repairs conducted. Again, the customer must typically negotiate with several service providers before obtaining a desirable fee. This negotiation process is time consuming for both the customer and the service provider. Further, the time required for generating and auditing invoices, as well as the time required to correct any errors, is burdensome to the service provider and the customer. This time lost in negotiation and billing review could better be spent by the service provider in performing services for more customers and could better be spent by the customer in conducting his normal activities.

The above discussed glass repair and home repair fields are simply exemplary of the numerous commercially fragmented fields in which improvements could be made to benefit both the service providers and the customers who desire the particular services.

Therefore, it would be advantageous to provide a method and apparatus for coordinating services which could be practiced over a wide variety of service applications and which could be used by a variety of types of customers. It would further be advantageous to provide a method and apparatus for coordinating services that not only benefits the customer but also fosters competition among the service providers. It would be particularly advantageous to provide a method and apparatus for coordinating the automotive glass repair process for the policyholder of an insurance company which eliminates the middleman, which are more acceptable to independent repair shops, and which overcome or reduce the drawbacks associated with the prior automotive glass repair systems discussed above.

SUMMARY OF THE INVENTION

The invention relates to a method of coordinating or arranging services and to an apparatus for practicing the method. Exemplary services suitable for the practice of the invention include, but are not limited to, automotive glass replacement, collision repair services, automotive paint refinishing, fire repair services, general repair services (such as automotive or home repair services), clothing repair services, plumbing services, medical services, retail or wholesale merchandise services, towing services, rental car services, parts supply services, and purchasing services, just to name a few. The invention could be used by a wide variety of customers, such as but not limited to, insurance company policyholders, fleet companies, employees of a company, members of a particular organization or association, third party payors, and individual cash payors, just to name a few.

In the practice of the method, a service coordinator generates a database of service providers. Service need information is received concerning a customer. The service need information can be received directly from the customer or through an intermediate, such as an organization or company. If the customer has no initial preference for a particular service provider to provide the service, at least a portion, preferably less than all, of the service providers in the database is selected based on the service need information. The selected service providers are ranked, e.g., by pricing criteria, customer satisfaction data, and/or date of last job awarded by the service coordinator, and at least a portion of the ranked service providers is presented to the customer. The customer may then choose one of the presented service providers to perform the service.

In a particular embodiment, the invention provides a method of coordinating an automotive glass repair process for the policyholder of an insurance company, and to an apparatus for practicing the method. This particular method includes providing a database of glass repair shops, obtaining glass loss information regarding the policyholder, selecting at least a portion of the glass repair shops in the database based on the glass loss information, ranking the selected glass repair shops, and presenting at least one of the ranked repair shops to the policyholder for selection to perform the glass repair.

DESCRIPTION OF THE INVENTION

As used herein, the term "services" is not limited to labor only but may include parts alone, labor alone, or both parts and labor. Likewise, the term "service provider" may include a provider who supplies parts alone, labor alone, or a combination of parts and labor.

The invention relates generally to a method and apparatus for coordinating or arranging for services. In the following discussion, the general practice of the invention will first be discussed. Afterwards, both a method and apparatus are explained with particular reference first to coordinating the automotive glass repair process for the policyholder of an insurance company and second for coordinating home repairs. However, it is to be understood that these uses of the invention are simply exemplary uses and should not be considered as limiting. The method and apparatus of the invention can be practiced in a variety of fields, such as but not limited to, towing services, clothing repair services, plumbing services, medical services, parts supply services, retail or wholesale merchandise services, automotive parts services, collision repair services, automotive paint refinishing, fire repair services, home repair services, rental car services, and purchasing services, just to name a few. Additionally, the invention is not limited to use with insurance company policyholders but could be used for a variety of customers, such as but not limited to fleet companies, employees of a particular company, members of a particular organization or association, third party payors, and individual cash payors, just to name a few.

Figure 1:
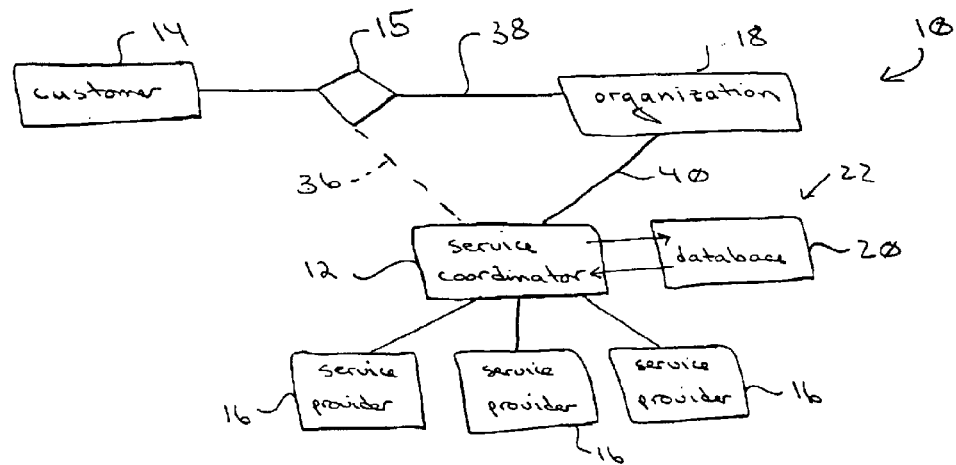
FIG. 1 is a schematic, block diagram of an exemplary service coordination system of the invention.

An exemplary service coordinating system 10 incorporating features of the invention is schematically shown in FIG. 1.

In the general practice of the invention, a service coordinator 12 coordinates the particular services required by a customer 14 from one of a number of service providers 16. The customer 14 may be a member of a particular company or organization 18 having a working relationship with the service coordinator 12. Alternatively, the customer 14 may be an individual consumer. The service coordinator 12 forms and maintains a database 20 including service providers 16 willing to perform services for the particular customer 14 and/or organization 18 under a particular pricing structure or selection criteria. The database 20 can be maintained, for example, on a computer system 22. Upon receipt of service need information concerning the customer 14, the service coordinator 12 may present one or more selected service providers 16 from the database 20 to the customer 14 for choice to conduct the desired services as described below. The service need information may be received directly from the customer 14 or through the organization 18. This general practice of FIG. 1 will first be explained in detail with reference to coordinating a glass repair process for a policyholder of an insurance company.

In this exemplary automotive glass repair process, he service coordinator 12 will be referred to as a glass repair coordinator (GRC). The GRC coordinates the glass repair process for the policyholder or "insured" (customer 14) of an insurance company (organization 18) at one of a number of glass repair shops (service providers 16) selected from a plurality of service providers 16 as described below. The GRC forms and maintains a database 20 of glass repair shops, as will be described in more detail below. The database 20 is preferably an electronic database maintained on a conventional computer system having a conventional memory device and conventional input and output devices. Alternatively, the database could also be maintained in other manners, such as manually with a writing in one or more notebooks. Of course, the manual method has several disadvantages, such as being more labor intensive, more time consuming, slower, more cumbersome, and requiring more space to store the database (notebooks).

Figure 2:
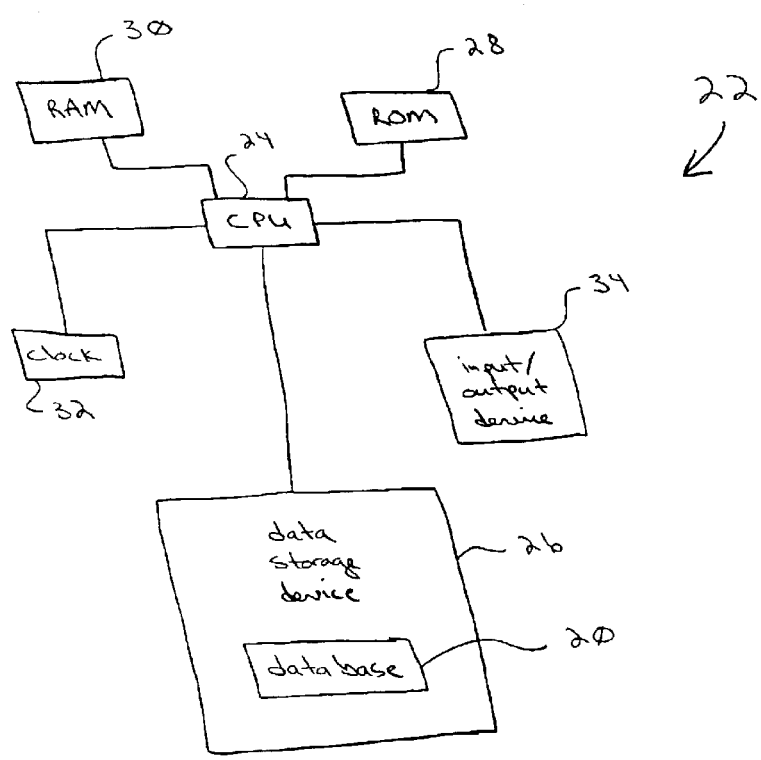
FIG. 2 is a block diagram of a computer system which may be used in the practice of the invention.

A block diagram of a conventional computer system 22, which may be used for the practice of the invention, is shown schematically in FIG. 2. The computer system 22 includes a central processing unit (CPU) 24 in electronic communication with a data storage device 26, such as a hard drive, optical disk, and the like for storing the database 20. The CPU 24 may also preferably be in electronic communication with one or more of a read only memory (ROM) 28 which stores CPU program instructions, a random access memory (RAM) 30 for temporary data storage, and a clock 32 for providing time signals to the CPU 24. An input/output device 34 may be connected to the CPU 24 and may be of any conventional type, such as a monitor and keyboard, mouse, touchscreen, printer, voice activated, etc. The computer system 22 runs appropriate custom-designed or conventional software to perform the steps of the invention, for example "Ingress" software commercially available from Computer Associates International, Inc. of New Jersey. The specific hardware, firmware and/or software utilized in the system 22 need not be of a specific type but may be any such conventionally available items designed to perform the method or functions of the present invention. The computer system 22 is simply an example of one suitable computer system for the practice of the invention. Such computer systems are well understood by one of ordinary skill in the art and examples are disclosed, for example, in U.S. Pat. Nos. 5,794,207; 5,884,272; 5,797,127; 5,504,674; 5,862,223; and 5,432,904, which are herein incorporated by reference.

In the general practice of the invention as described in FIG. 1, when the customer 14 desires a particular service, the customer 14 contacts the service coordinator 12 to arrange for the services to be provided. With reference to FIG. 1, the customer 14 may contact the service coordinator 12 directly (step 36). Alternatively, as indicated by the "if-then" symbol 15 in FIG. 1, if the customer 14 is a member of a qualified organization 18, i.e., such as an insurance company, doing business with the service coordinator 12, the customer 14 may first contact the organization 18 (step 38) which then contacts the service coordinator 12 (step 40), with or without the customer 14. The service coordinator 12 obtains the particular service need information, and optionally, verifies the customer's authorization to request the services and/or confirms the customer's payment information, e.g., credit card number. As will be appreciated, the particular service need information depends on the particular field of services desired by the customer 14.

Figure 3:
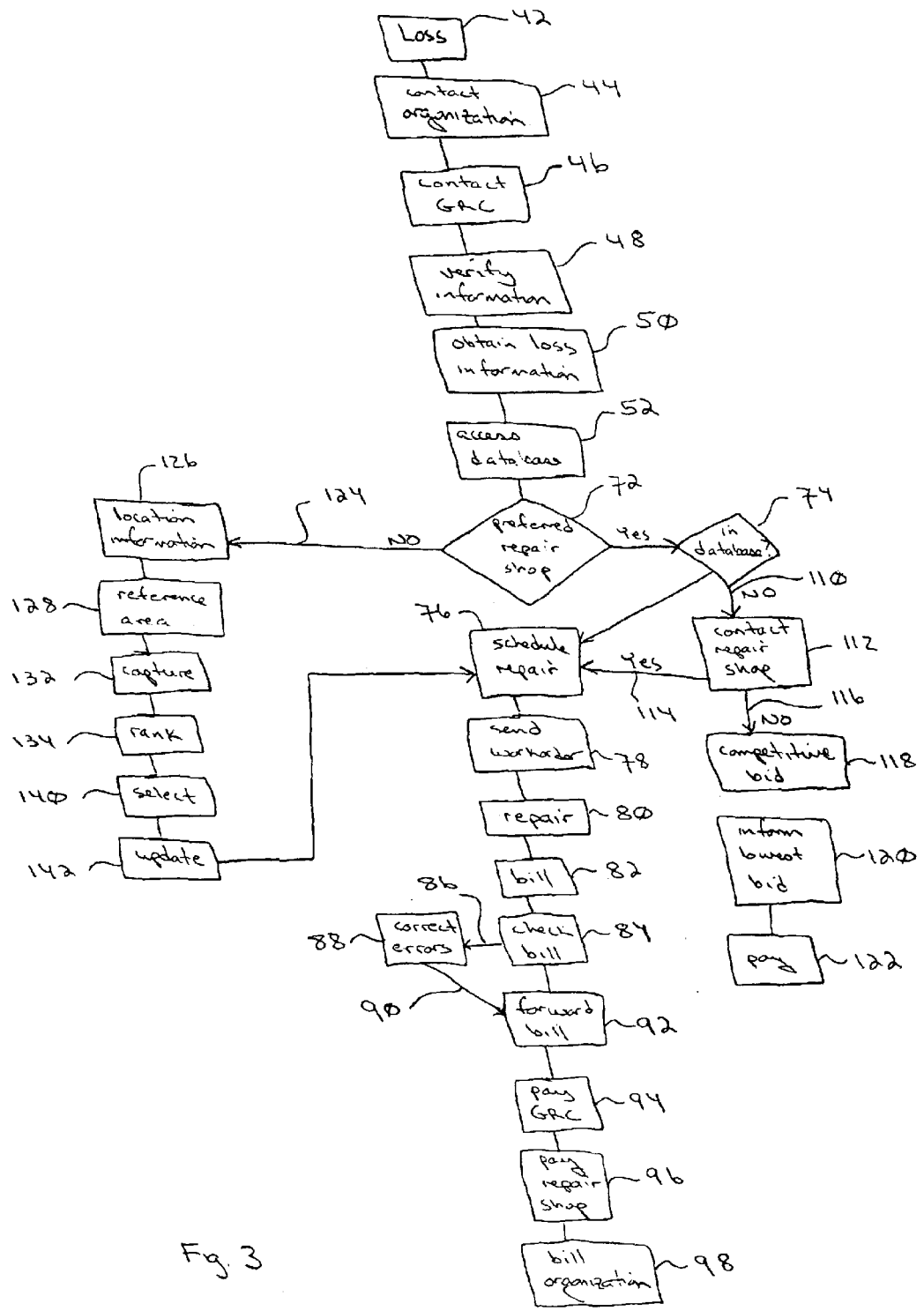
FIG. 3 is a flow diagram of an exemplary glass repair method of the invention.

In the exemplary automotive glass repair process under discussion, with reference to FIGS. 1 and 3 as needed, when the insured (customer 14) of the insurance company (organization 18) suffers an automotive glass loss (step 42), such as damage to a windshield, sidelight, backlight, etc., the insured contacts (step 44) the insurance company either directly or through a designated agent, such as the insured's local agent or a claims adjuster. This contact may be conducted, for example, telephonically, in person, via the Internet, or by any other conventional manner.

The insurance company and insured may together contact (step 46) the glass repair coordinator (GRC) or, as discussed above, the insured may contact the GRC directly, e.g., telephonically. In either case, upon initial contact, the GRC verifies (step 48) the insured's authority to request the services, e.g., that the insured has an up-to-date policy with the insurance company, such as by accessing the insurance company's computer system. The computer system 22 of the GRC preferably has an electronic data link, e.g., direct line or through a modem, with the insurance company's customer database to allow the GRC to access the insurance company's client records to verify this information.

Assuming the insured has a valid insurance policy with the insurance company, the GRC obtains service need information, in this exemplary example, glass loss information (step 50), from the insured such as the make and model of the vehicle, type of damage, date of damage, cause of damage, whether the vehicle is mobile, the insured's telephone number, address, current location, etc. With enough such information, the GRC accesses (step 52) the database 20 maintained by the GRC via the GRC's computer system 22 to coordinate the repair process of the insured's glass damage. For example, the GRC may access the database 20 through a conventional keyboard and monitor device.

Additionally or alternatively, employees of the organization 18, in this example the insurance company, can access the database 20 as described below to coordinate the repair process rather than the GRC accessing the database 20.

Before proceeding with further explanation of coordinating the particular glass repair process under discussion, an exemplary method of forming and maintaining the database 20 will be described. In the general practice of the invention, service or part information, such as pricing information of the service provider, is obtained by the service coordinator 12. This pricing information may be established over a variety of service zones, which service zones may be defined geographically or in any other desired manner. One or more service factors may be established for each service zone and may define, for example, a threshold price adjustment, which may be positive (an additive) or a reduction, for services provided in that service zone. A supplemental service factor and/or customer satisfaction index may optionally be assigned to selected service providers in the service zone.

Figure 4:
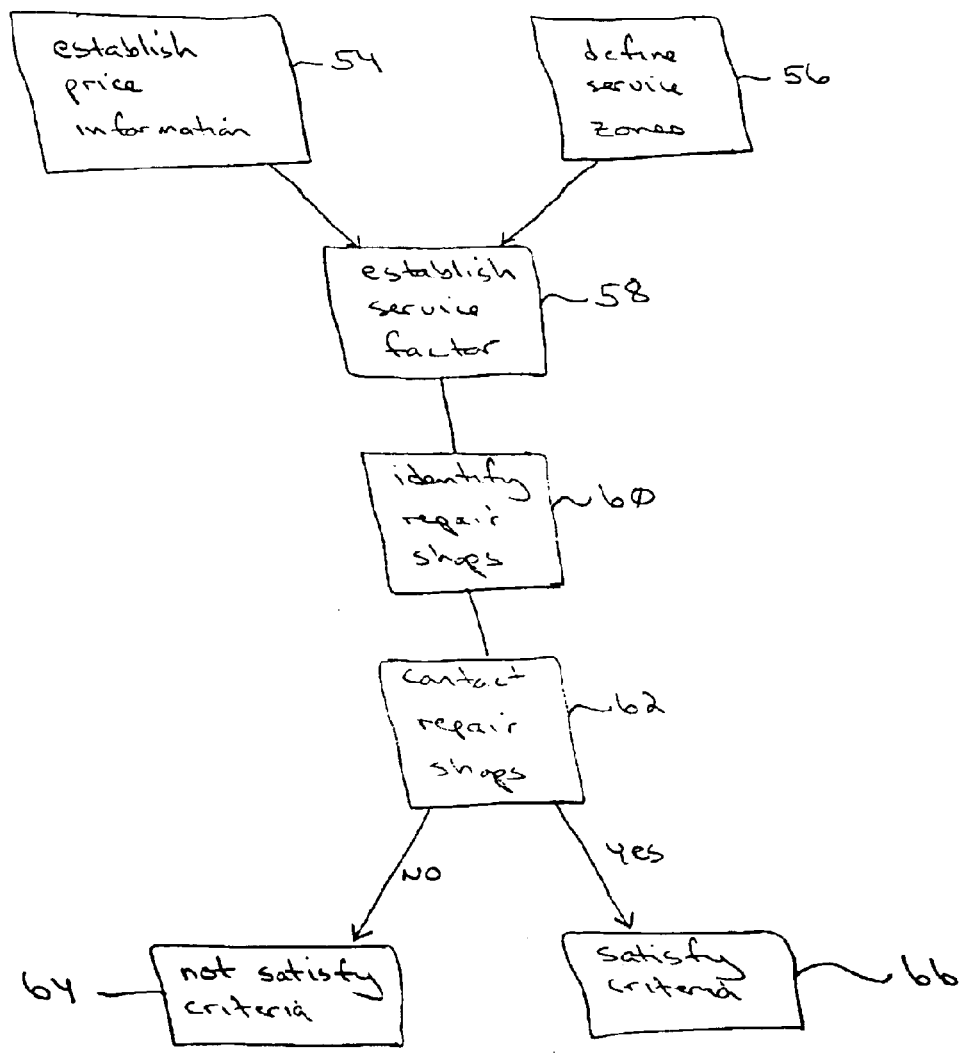
FIG. 4 is a flow diagram of how repair shop information may be selected and input into a database in accordance with the invention.

These concepts will now be particularly described with specific reference to the exemplary automotive glass repair process under discussion and with particular reference to FIG. 4. Service pricing information, e.g. glass repair price information, is obtained and/or generated by the GRC (step 54). For example, but not to be considered limiting, Mitchell International, Inc., through its subsidiary NAGS, publishes a list of suggested repair costs for various glass repairs. This suggested price list can be used to establish a "first price" for a particular type of glass repair. This list is licensed and is publicly available for a fee. The NAGS price information for different repairs may be input into the database 20 and stored on the data storage device 26 as the first price for the glass repairs. Alternatively, a first price for repairs can be developed by the GRC or by the insurance company in any desired manner, e.g., based on historical information such as prior repair costs, dealer list prices, or in any other suitable manner.

The service zones are defined (step 56); for instance, geographically, demographically, by population centers, by location of the service providers 16, by delivery areas, by business considerations (such as geographic proximity of service providers) or in any other convenient manner. In the exemplary glass repair process under discussion, a geographic location designation for each repair shop is obtained. For example, the United States government generates and publishes a list of metropolitan statistical areas (MSA) for geographical regions of the United States. The MSA's are typically divided or separated by population densities. The MSA's may be obtained and may be input into the database 20. Alternatively, the service zones may be defined in any convenient manner, such as by the GRC or the insurance company, as desired.

At least one service factor is established for each service zone (step 58). The service factor may be established by the organization 18, or for individual customers 14, by the GRC. The service factor is typically established by the organization 18 for each service zone and is communicated to the service coordinator 12, who enters the respective service factors into the database 20. The service factor for a particular service zone can be changed at any time by the organization 18 to account for changes in business conditions, such as scarcity of parts, increased parts costs, inflation, etc. For example, the service factor may be a price adjustment to the first price applicable to each service provider 16 in a particular service zone. The price adjustment may be based on a specific dollar discount, e.g., a reduction in the price charged by the service provider 16 for parts and labor or for parts alone or for labor alone. The service factor may also be defined as a percentage adjustment for the service providers 16 or in any other convenient manner. As discussed below, the service factor can be a reduction, i.e., a discount, or may be a positive adjustment, i.e. a price increase to the first price. One or more service factors may be established for each service zone. For example, in addition to a price adjustment service factor, an additional service factor or customer perk, such as free customer pick up, free rental car, free newspaper, etc., may be established for one or more service zones.

In the exemplary automotive glass repair process under discussion, each service zone, e.g., MSA, may have a service factor in the form of a particular price adjustment applied to the first price, e.g., NAGS suggested price, for glass repair services in that particular MSA. The first price adjusted by the service factor defines a modified price for services conducted in a particular service zone. For example, Table I shows a list of MSA's (1–4) with an exemplary associated service factor in the form of a percentage price adjustment established for each MSA. The MSA's are listed in order of population density, with the most populous MSA being MSA#1 and going to the least populous MSA#4.

TABLE I

| MSA | Service factor % |
|---|---|
| 1 | −44 |
| 2 | −35 |
| 3 | −25 |
| 4 | +10 |

For MSA's 1–3, the service factor is a negative number, meaning that the first price is reduced by the amount of the service factor in that MSA to define the modified price. For example, for MSA#1, the first price are reduced by 44%. Therefore, if a first price for a particular glass repair is $1.00, the modified price would be $0.56, which would be a savings passed on to the insurance company. The service factors may be established for different service zones based on the observation that repair shops in more populous areas can typically perform automotive glass repairs for less than the NAGS suggested price since they typically have ready access to equipment, supplies and labor. However, MSA#4, the least populous area, has a positive number service factor, meaning that the first price, i.e. NAGS suggested price, is increased by the amount of the service factor in MSA#4. For example, if the first price is $1.00, the modified price in MSA#4 would be $1.10. This higher price in MSA#4 is provided, for example, because repair shops in less populous areas may typically have a harder time obtaining parts, supplies and labor and hence their costs may be higher than those in more populous areas. This service factor difference between the service zones of different population density can be thought of as overcoming a previously perceived unfairness by repair shops in less populated areas when the glass middleman may have insisted on a single discount for all repair shops regardless of population densities. Of course, different organizations 18 or service providers 16 may desire different service factors based on their particular preference or style of operation. Therefore, the service factors for each service zone may be different for different organizations 18 with which the GRC does business. The database 20 of FIG. 1 facilitates the service coordinator's ability to handle these situations.

Again, with reference to FIG. 4 in the exemplary glass repair method, when the service zones have been defined and the service factors established, glass repair shops in each MSA are identified (step 60), such as through the telephone book, electronic directory, etc., and contacted (step 62) to determine if they are willing to do glass repair services for the particular insurance company at a price similar to the modified price (i.e., the first price multiplied by the service factor(s) for that service zone). If a repair shop declines, it may not be listed (step 64) in the database 20 or may be listed as not satisfying the criteria for that particular insurance company of customer 14. However, if a repair shop is willing to conduct glass repair services for the organization 18, service coordinator 12, or customer 14 at a price at or similar to the modified price, the information for that repair shop, e.g., location, hours, types of services provided, telephone number, etc., is entered for these criteria into the database 20 (step 66). In addition to the GRC contacting the service providers 16, the service providers 16 themselves can contact the GRC, for example by telephone, mail, Internet, or the like and request to be added to the database 20.

Thus, in order for information about a repair shop to be added to the database 20 as satisfying the criteria for a particular service zone, the repair shop should be willing to provide one or more of the service factor(s) for the particular service zone in which it is located when providing services through or for the service coordinator 12, e.g., provide services at the modified price. However, individual service providers 16 may be willing to augment the services they provide for a particular organization 18 or type of customer 14. For example, a repair shop in the database 20 may also be willing to provide one or more additional discounts or perks ("supplemental service factor(s)") over and above the service factor(s) for services provided through the GRC to a particular organization 18 or customer 14. For example, Table II lists three exemplary glass repair shops (RS1–RS3) in MSA#1.

TABLE II

| Repair Shop | MSA | Service Factor % | Supplemental Service factor % | Total Discount | Satisfaction Index |
|---|---|---|---|---|---|
| RS1 | 1 | −44 | 0 | −44 | 1 |
| RS2 | 1 | −44 | −7 | −51 | 2 |
| RS3 | 1 | −44 | −10 | −54 | 3 |

For each exemplary repair shop in MSA#1 the exemplary service factor for the present discussion is −44%. This means that each glass repair shop listed in the database 20 as satisfying the criteria for MSA#1 has expressed a willingness to conduct glass repair services for the particular organization 18 or customer 14 at a discount of 44% off of the defined comparison price. However, if a particular repair shop wishes to further discount the price at which it is willing to conduct glass repair services for the particular organization 18 or customer 14, e.g., if glass repair shop RS3 is willing to discount an additional 10% from the price it charges for the particular glass repair, a supplemental service factor of 10% is input for RS3. Thus, RS3 is actually willing to conduct automotive glass repair services for the organization 18 at a total discount (i.e., service factor(s) plus any supplemental service factor(s)) of −54% off of the first price. For each repair shop in the database 20 identified as satisfying the criteria for the service zone in which it is located, e.g., those repair shops willing to provide services at a cost incorporating the service factor(s) for that service zone, repair shop information such as location, assigned service zone, service factor(s), any supplemental service factor(s) offered by the repair shop, which organization 18 or customer 14 the repair shop will work for, etc., is entered into the data storage device 26 in conventional manner, such as by the input/output device 34, to form the database 20.

Further, as shown in Table II, a consumer satisfaction index optionally may be established for each repair shop. The satisfaction index reflects the past performance of the repair shop and/or the quality of past services. For example, a numerical designator from 1 to 5 can be entered for each repair shop based on such factors as customer complaints, customer surveys, complaints to the Better Business Bureau, customer compliments, random spot checks on the quality of the service provided, etc. For instance, a "1" designation may indicate the highest customer satisfaction and/or repair service quality and "5" may indicate the lowest satisfaction and/or quality. While the above discussion was directed specifically to the exemplary glass repair process under discussion, it will be appreciated that the same concepts described above could be applied to any desired service application, such as, for example, home repair services as described below.

Returning to the exemplary glass repair process shown in FIG. 3, when the insured contacts the GRC, the GRC inquires if the insured has a preferred glass repair shop (step 72) where the insured wishes the glass repair services to be conducted. If the insured has a preferred repair shop, the GRC checks the database 20 to see if the preferred shop is one of the shops in the database 20 (step 74). If it is, the GRC contacts that repair shop to schedule the automotive glass repair (step 76) and, if the preferred repair shop can perform the repair services in a timely manner, informs the insured of the scheduled repair date. The GRC may send (step 78) the repair shop a work order and the repair shop conducts (step 80) the glass repair.

While in the preferred method of the invention the GRC accesses the database 20 and coordinates the glass repair process, this procedure could also be conducted by employees of the organization 18 who are provided access to the computer system 22 and the database 20. In this alternative embodiment, the GRC would actually be a part of the organization 18.

After completing the repair, the repair shop sends a bill to the GRC (step 82), billing the discounted price (modified price) for the particular service zone, including any supplemental discounts (supplemental service factor(s)) the glass shop is willing to give to the organization 18 or customer 14. The GRC preferably compares (step 84) the repair shop bill against the work order to make sure there are no errors in the bill. If there are errors (step 86), the GRC contacts (step 88) the repair shop to correct the errors and the repair shop may then submit a corrected bill (step 90) to the GRC. Alternatively, the GRC may simply correct the bill and notify the repair shop of the correction. If there are no errors or if the errors have been corrected in the bill, the GRC forwards (step 92) the repair shop bill to the insurance company and the insurance company may remit payment (step 94) to the GRC. The GRC may then remit payment (step 96) to the repair shop. The GRC bills (step 98) the insurance company, e.g., a flat fee, for each glass repair transaction it handles. In this manner, the discounted repair price offered by the repair shop is passed directly to the insurance company, which receives the full benefit of the lowest price available. This savings can be passed to the customer 14, for example, in the form of lower premium payments. Alternatively, the GRC could be compensated on a percentage basis based on the cost savings to the insurance company in similar manner as described above or can collect a fee from the repair shop (e.g., a flat fee or a percentage of the repair cost).

As can be appreciated, in the above exemplary illustration the insurance company remitted payment to the GRC. However, rather than remitting payment to the GRC as described above, the insurance company, after receiving a corrected invoice, may remit payment directly to the insured and then the insured may be responsible for paying the repair shop or the insurance company could remit payment directly to the repair shop.

With continued reference to FIG. 3, if the preferred repair shop selected by the insured does not meet the criteria to be listed (step 110) in the database 20 for the particular service zone involved, the GRC may contact (step 112) the preferred repair shop to see if the repair shop is willing do the glass repair services for the insurance company (organization 18) at or about the modified price (service factor(s) adjusted first price) for that particular MSA (service zone). If the preferred repair shop is willing (step 114), the GRC schedules (step 76) a repair time and sends a work order to the repair shop, as described above.

If the preferred repair shop declines (step 116) to conduct the glass repairs services for the insurance company (organization 18) or customer 14 (insured) at or about an established discounted price for that service zone, i.e., first price adjusted by any service factor(s) and/or any supplemental service factor(s), the GRC may conduct a competitive bidding process (step 118). The GRC may contact at least one other repair shop, e.g., one of the repair shops in the database, in addition to the preferred repair shop and asks each repair shop to submit a bid for the particular glass repair services. The GRC informs (step 120) the insurance company of the lowest bid and the insurance company then pays (step 122) the insured the amount of the lowest bid. The insured is then free to either have the repair services conducted at the repair shop which issued the lowest bid or the insured can have the glass repair services conducted at another repair shop, in which case the insured would be personally responsible for paying the selected shop any amount over the amount of the lowest bid. Alternatively, the insurance company may simply agree to pay the preferred repair shop's initial price without going through the competitive bidding process to maintain good relations with the insured. Optionally, the insurance company may pay the insured rather than the repair shop, e.g., may pay the insured the lowest of the competitive bids.

Figure 5:
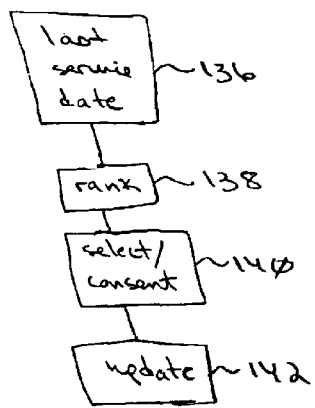
FIG. 5 is a flow diagram of a first exemplary method of ranking repair shops.

With ongoing reference to FIG. 3, if the insured has no preferred repair shop or if the preferred repair shop cannot conduct the repair service (step 124), the GRC obtains (step 126) location information from the insured, such as telephone number (home and/or work), address, whether the vehicle is mobile, etc. The GRC then defines, e.g., geographically maps (step 128), a reference area, e.g., an area around the insured's location, using the computer system and conventional software such as is available from the Mailer Software Company of Rancho Santa Margarita, Calif. For example, the insured's telephone number may be geographically located (e.g., by latitude and longitude) as a reference point or location and the designated reference area plotted (step 128) around that location, e.g., using the computer system to electronically plot an area, such as a circle having a selected radius, around the insured's location (reference point). For example, if the vehicle is mobile, the reference area may have a radius of about 1–20 miles. If the vehicle is not mobile, the reference area may be smaller, e.g., 1–10 miles. The GRC identifies or "captures" (step 132) the repair shops in the database within the reference area which meet the criteria for that service zone, i.e., those repair shops capable of conducting the repair and willing to work for the particular organization 18 or customer 14 involved at an established discounted price (first price adjusted by any service factor(s) or supplemental service factors(s)) for the service zone involved. The identified repair shops within the reference area are then ranked 134. The repair shops may be ranked in any manner designated by the particular organization 18, customer 14, or service coordinator 12, e.g., by order of total discount provided, by satisfaction index, by location, or by the chronological date of the last repair service awarded to the repair shop by the GRC when an insured had no repair shop preference ("service date"). For example, as shown in FIG. 5, the last service date for each repair shop may be ascertained (step 136) and the shops ranked (step 138) in chronological order by date of last service date, with the shop having the earliest date at the top of the list and the shop having the most recent date at the bottom of the list.

As shown in Table III, if three repair shops (RS1–RS3) are located in the relevant area defined by the reference area around the insured's location, shop RS1, having the earliest service date is ranked at the top and shop RS3 having the most recent date is ranked at the bottom.

TABLE III

| Repair Shop | Date of last service awarded |
|---|---|
| RS1 | Jan. 1, 1997 |
| RS2 | Jan. 1, 1998 |
| RS3 | Jan. 1, 1999 |

After ranking, the GRC may start at the top of the list and may ask the insured whether he will consent to have the repair work done at the first repair shop listed, e.g. in the example in Table III this would be shop RS1 or to select one of the repair shops (step 140). If the insured consents or selects repair shop RS1 and the repair shop RS1 is able to do the work, the repair service date for shop RS1 is updated (step 142) with the current date, essentially moving it to the bottom of the rotation for that reference area. If the insured declines to go to shop RS1 or if the shop RS1 cannot perform the repair services in a timely manner, the GRC moves down the list, one or more shops at a time, until the insured chooses a repair shop that can conduct the repair services. The service date for the chosen repair shop is then updated in the database. Optionally, rather than presenting the ranked shops to the insured one at a time, the ranked shops can be presented in groups of two or more to the insured.

In the presently preferred method, the database 20 is only rotated (step 142), e.g., the service date for the shop updated, for jobs where the insured has no initially preferred repair shop and merely selects one of the repair shops from the database 20 offered by the GRC. For example, if a repair shop is listed in the database 20 but the insured selects that repair shop as his preferred repair shop when initially questioned by the GRC, the service date of this selected repair shop is not updated. In any event, once the insured chooses a repair shop, the GRC contacts the chosen repair shop to schedule a repair (step 76) and the method proceeds as discussed above and shown in FIG. 3.

This rotation system as it pertains to shops ranked first or near the top of the ranked list and which may also be selected by the insured is inviting to repair shops because the repair shops are not losing any business. Each repair shop not only gets what it would have gotten from people choosing that repair shop but also gets additional jobs from people with no preference when the particular repair shop is at or near the top of the list. This generates an incentive to individual repair shops to join the database of the GRC.

Figure 6:
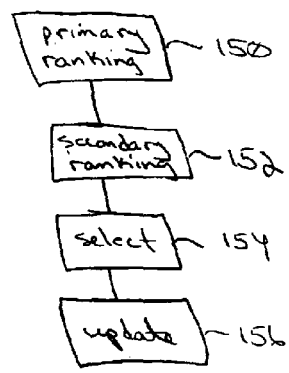
FIG. 6 is a flow diagram of a second exemplary method of ranking repair shops.

An alternative method of ranking and selecting a service provider 16 when the customer 14 has no repair shop preference is shown in FIG. 6. After geographically mapping the insured location, a reference area is again plotted around the insured's location. At least a portion, and preferably all, of the repair shops in the database within the reference area capable of conducting the repair are again captured and ranked. However, in this embodiment, the repair shops are first ranked (primary ranking) by price criteria (step 150), e.g., with the shop having the largest total service factor and supplemental service factor (i . . . , highest discount or lowest price) ranked first and the shop with the smallest total service factor and supplemental service factor (i.e. smallest discount or highest price) ranked last. After this primary ranking, a selected portion of the list is ranked again (step 152) (secondary ranking), e.g., by satisfaction index, location, or the date of the last awarded service date. The portion selected for the secondary ranking may be chosen by the organization 18 or the GRC. For example, the portion could be the top twenty percent of the list, the top five listed repair shops, the repair shops having a supplemental service factor greater than a predetermined value, repair shops with a repair cost within a designated percentage, e.g., 10%, of the lowest repair cost, or in any other convenient manner. After the secondary ranking, the GRC begins at the top of the secondary ranked list in suggesting a repair shop or a group of repair shops to the insured and continues down the list until the insured chooses (step 154) a particular repair shop. The service date for the selected repair shop is then updated (step 156) and the repair procedure continues as discussed above with the GRC contacting the repair shop to arrange a repair date (step 76).

With this alternative ranking and selecting method, each shop is encouraged to give the best discount available, which savings are passed directly onto the organization 18. This alternative rotation is also desirable to the organization 18 in that the organization 18 sees overall savings through this rotation method. For example, the repair shop with the largest discount does not always receive the awarded job. This works well for not only the organization 18 but also the other repair shops in that it is highly unlikely that the largest discounter could handle all of the work for a particular area. Therefore, even if the other shops know they cannot offer the same discount as the largest discounter, they still have an incentive to offer as large a discount as possible to try to be near the top of the primary ranked list and selected for the secondary ranking procedure to be selected by the customer 14 and awarded jobs from the GRC. It is also beneficial for the insured because it gives the insured more choices of repair shops. The insured may feel more comfortable with a national name or, alternatively, with a local name with which the insured is familiar. Allowing the insured to participate in the repair shop selection process makes the insured feel good about the insurance company and increases the chance the insured will stay with the insurance company for auto as well as other insurance needs.

It is to be understood that the above examples of ranking the repair shops in the database reflect exemplary embodiments of the invention and are not to be considered as limiting. For example, in the ranking methods discussed above, the satisfaction index may also be used in either the primary or secondary ranking procedures (step 150 or step 152) to eliminate those repair shops having a satisfaction index below a predetermined value, such as 3 for example, or to further rank the selected repair shops.

The exemplary method of coordinating a glass repair process in accordance with the invention is advantageous to insurance companies in that it takes a fragmented market place (repair shops) and makes it more organized for the insurance company. The savings, e.g., discounts, offered by the repair shops are passed directly to the insurance company, which may pay a flat fee for each transaction. These savings can in turn be passed on to the customers 14. The method also provides a national discount offering the best price available in every market.

As a further example of the invention, a general discussion of an exemplary use of the invention will now be discussed with reference to providing home repair services for a homeowner (customer 14). In this example, with reference to FIG. 1, the service coordinator 12 establishes a database 20 of home repair service providers (service providers 16) in similar manner as in the glass repair example described above. For example, the service coordinator 12 can establish service zones, determine service factor(s), supplemental service factor(s), satisfaction index (indexes), etc., and then enter into the database 20 those home repair service providers willing to conduct home repairs for compensation based on these established criteria. For purposes of this example, it will be assumed that the service coordinator 12 is not working for any particular organization 18 but rather develops and maintains the database 20 on its own and has been contacted directly by the customer 14.

Figure 7:
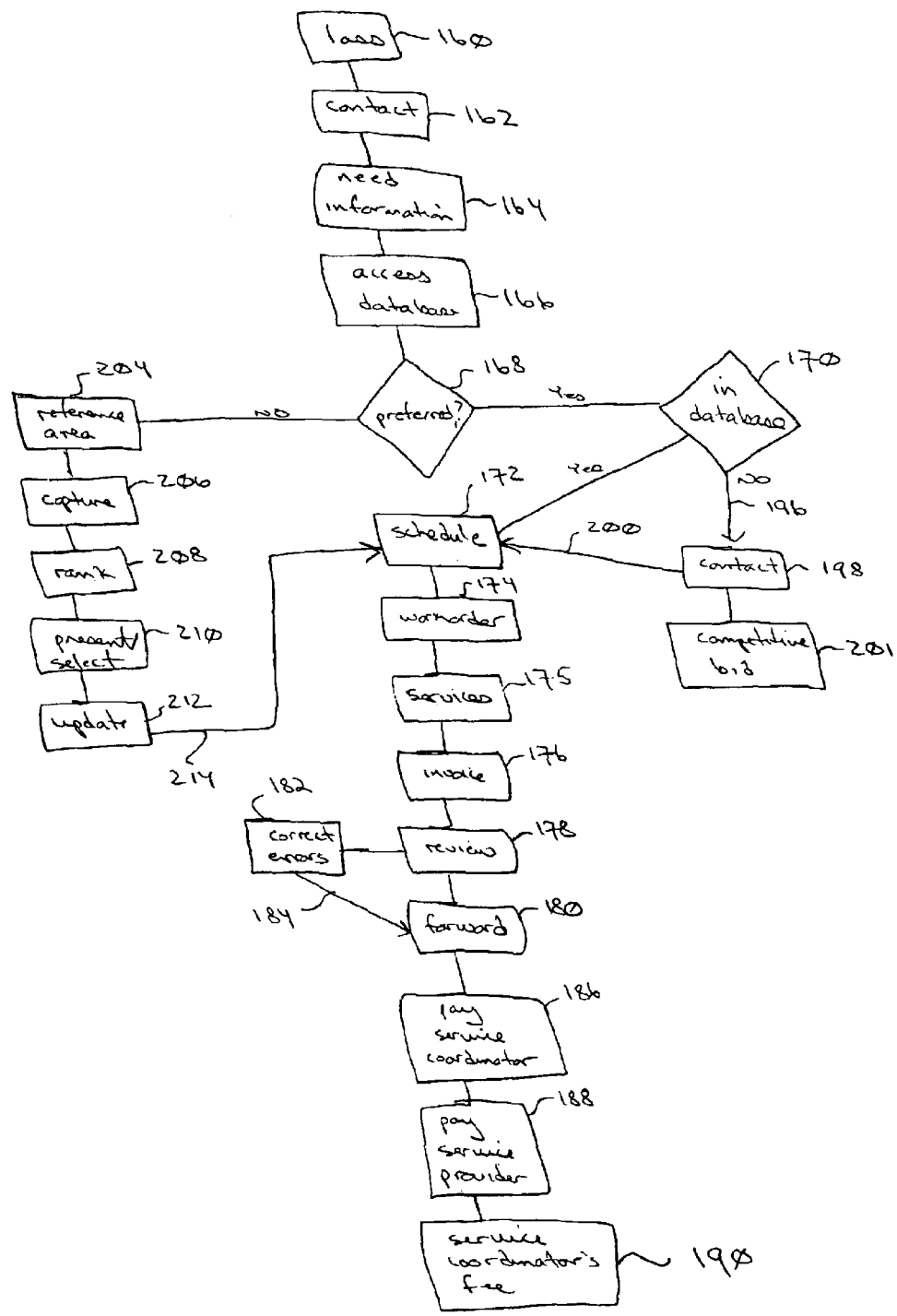
FIG. 7 is a flow diagram, similar to FIG. 3, of an exemplary home repair method of the invention.

With reference to FIGS. 1 and 7 as needed, after the homeowner suffers home damage or desires to have home repairs conducted (step 160), such as adding aluminum siding, covering a patio, or repairing roof damage, just to name a few, the homeowner contacts (step 162) the service coordinator 12. The service coordinator 12 obtains the service need information (step 164) which, in the case of home repairs, may include the homeowner's address, telephone number, type of damage, extent of damage, and the like. The service coordinator may then access the database 20 (step 166). The service coordinator 12 may then ask if the homeowner has a preferred service provider 16 (step 168). If so, the service coordinator 12 checks the database 20 for the preferred service provider 16. If the preferred service provider 16 is in the database (step 170), the service coordinator 12 contacts the preferred service provider 16 and schedules a time for the repair services to be conducted (step 172). The service coordinator 12 may send the service provider 16 a work order (step 174). The service provider 16 then conducts the repair (step 175) and sends the service coordinator 12 an invoice (step 176). The service coordinator 12 may review the invoice (step 178) and, assuming there are no errors, forwards the invoice to the homeowner (step 180). If there are errors in the invoice, the service coordinator 12 corrects the errors (step 182) before forwarding the invoice to the homeowner (step 184). The homeowner may forward payment to the service coordinator 12 (step 186) who subtracts the service coordinator's fee, e.g., either a flat fee or a percent of the repair cost, and pays the service provider 16 (step 188) for the services provided. Alternatively, the homeowner may forward payment directly to the service provider 16 whereupon the service provider 16 forwards service coordinator's fee to the service coordinator 12.

However, if the preferred service provider 16 is not listed in the database 20 (step 196) as meeting the criteria for the service zone involved, the service coordinator 12 may contact the preferred service provider 16 (step 198) and inquire if the service provider 16 is willing to perform services for the homeowner in accordance with the criteria, e.g., service factor(s), supplemental service factor(s), etc., previously established by the service coordinator 12 for that service zone. If the service provider 16 is so willing, the service coordinator 12 schedules the services (step 200) in similar manner as above. If the service provider 16 is not so willing, the service coordinator 12 may conduct a competitive bidding process (step 201) between the preferred service provider 16 and one or more other service providers 16 or the service coordinator 12 may simply agree to the preferred service provider's terms and schedule the repair services for the homeowner.

However, if the homeowner does not have a preferred service provider 16 or if the preferred service provider 16 cannot perform the services, the service coordinator 12 uses the homeowner's location (reference location) to generate a reference area (step 204) and captures (step 206) the service providers 16 in the database 20 located in the reference area who meet the criteria for that service zone and are capable of conducting the services. The captured service providers 16 are then ranked (step 208) in any desired manner, such as by lowest price, date of last awarded repair service, customer satisfaction index, or in any similar manner as described above in the glass repair example. For example, the captured service providers may undergo a primary ranking and a secondary ranking as described above in the glass repair example discussed above. At least a portion of the ranked service providers are then presented to the homeowner (step 210) for choice to conduct the repair service. The database information for the chosen service provider 16 is updated (step 212) and the repair services are scheduled (step 214).

It will be readily appreciated by those skilled in the art that modifications may be made to the invention without departing from the concepts disclosed in the foregoing description. For example, the present method and apparatus are not limited to the exemplary automotive glass repair or home repair examples discussed above but could be easily adapted for other fields or other types of customers. Accordingly, the particular exemplary embodiments described in detail herein are illustrative only and are not limiting to the scope of the invention, which is to be given the full breadth of the appended claims and any and all equivalents thereof.

What is claimed is:

1. A method of coordinating services among a paying organization, customers of the paying organization, and a plurality of service providers, comprising:

providing a computer database of service providers, the computer database including location and pricing information relating to each service provider, pricing criteria of the organization, and any supplemental inducements offered by certain of the individual service providers;

receiving from individual service providers on an ongoing basis data regarding availability of supplemental inducements for a particular service provider, and updating the computer database with current supplemental inducement data;

obtaining service need information concerning a customer of the paying organization, including location of the service need;

generating by means of a computer system a preliminary list of service providers selected from the computer database matching the customer's service need and location and satisfying the pricing criteria of the organization;

generating by means of a computer system a final list of service providers as a subset of the preliminary list, comprising a plurality of service providers having the most favorable supplemental inducements that are applicable;

ranking by means of a computer system the final list of service providers employing criteria compassing time interval since last service performed by each service provider; and presenting, in order of ranking, at least one of the ranked service providers to the customer for choice to perform the service.

2. The method of claim 1, wherein the service provider ranking is conducted by:

identifying the last date on which the service providers were assigned a service job when the customer had no repair shop preference; and ranking the service providers by the last service job date, with the most recent service date ranked last.

3. The method of claim 1, including billing the organization a fixed fee for each service coordination transaction.

4. The method of claim 3, wherein the organization is at least one insurance company and the customer is a policyholder of said at least one insurance company.

5. The method of claim 1, wherein the service is repair service.

6. The method of claim 5, wherein the repair service is automobile repair service.

* * * * *

UNITED STATES PATENT AND TRADEMARK OFFICE
CERTIFICATE OF CORRECTION

PATENT NO. : 6,950,801 B2
APPLICATION NO. : 09/618809
DATED : September 27, 2005
INVENTOR(S) : R. Brookes et al.

It is certified that error appears in the above-identified patent and that said Letters Patent is hereby corrected as shown below:

Please delete old existing Drawing sheets and insert these new drawings.

1/4

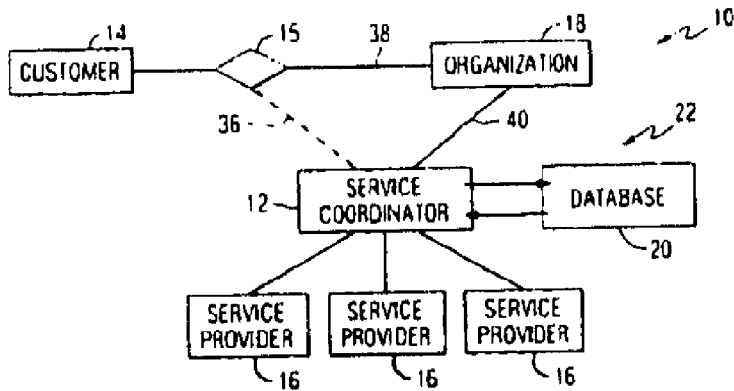

FIG. 1

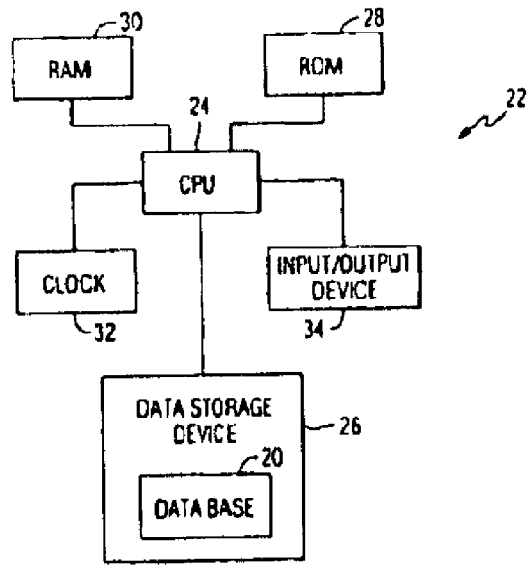

FIG. 2

UNITED STATES PATENT AND TRADEMARK OFFICE
CERTIFICATE OF CORRECTION

PATENT NO. : 6,950,801 B2  Page 2 of 4
APPLICATION NO. : 09/618809
DATED : September 27, 2005
INVENTOR(S) : R. Brookes et al.

It is certified that error appears in the above-identified patent and that said Letters Patent is hereby corrected as shown below:

2/4

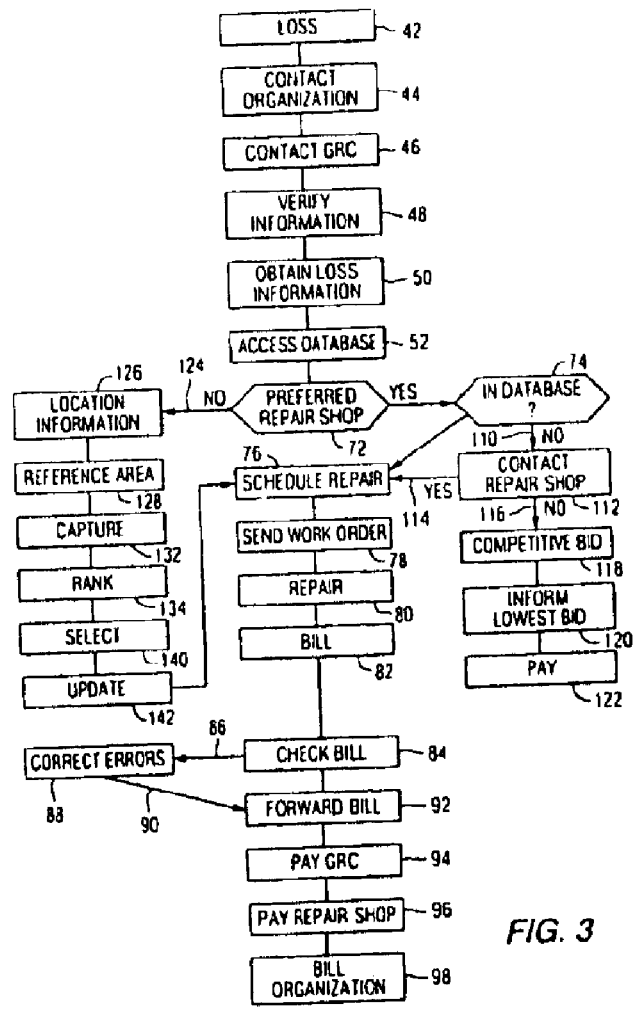

FIG. 3

UNITED STATES PATENT AND TRADEMARK OFFICE
CERTIFICATE OF CORRECTION

PATENT NO. : 6,950,801 B2
APPLICATION NO. : 09/618809
DATED : September 27, 2005
INVENTOR(S) : R. Brookes et al.

Page 3 of 4

It is certified that error appears in the above-identified patent and that said Letters Patent is hereby corrected as shown below:

3/4

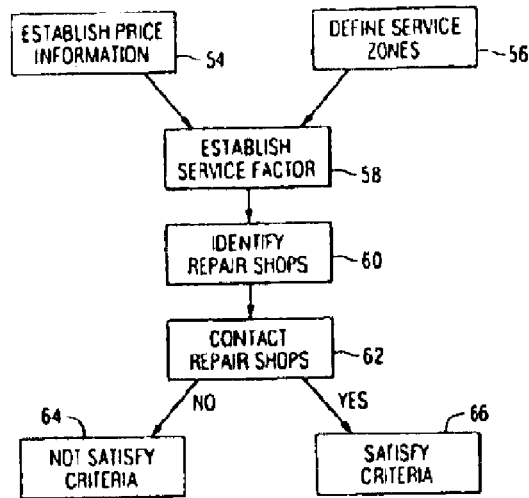

FIG. 4

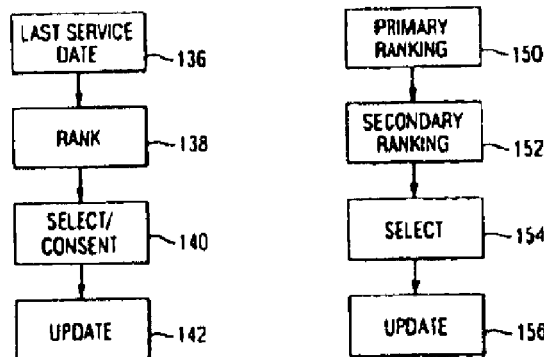

FIG. 5

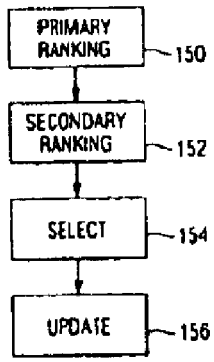

FIG. 6

UNITED STATES PATENT AND TRADEMARK OFFICE
CERTIFICATE OF CORRECTION

PATENT NO. : 6,950,801 B2  
APPLICATION NO. : 09/618809  
DATED : September 27, 2005  
INVENTOR(S) : R. Brookes et al.

Page 4 of 4

It is certified that error appears in the above-identified patent and that said Letters Patent is hereby corrected as shown below:

4/4

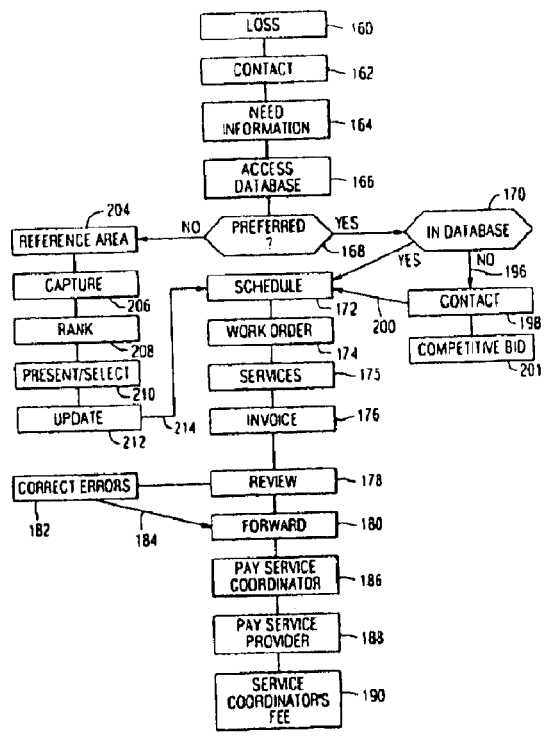

FIG. 7

Signed and Sealed this

Tenth Day of June, 2008

JON W. DUDAS  
*Director of the United States Patent and Trademark Office*

UNITED STATES PATENT AND TRADEMARK OFFICE
CERTIFICATE OF CORRECTION

| | |
|---|---|
| PATENT NO. | : 6,950,801 B2 |
| APPLICATION NO. | : 09/618809 |
| DATED | : September 27, 2005 |
| INVENTOR(S) | : R. Brookes et al. |

It is certified that error appears in the above-identified patent and that said Letters Patent is hereby corrected as shown below:

Delete the title page and substitute therefor the attached title page.

(12) United States Patent
Brookes et al.

(10) Patent No.: US 6,950,801 B2
(45) Date of Patent: Sep. 27, 2005

(54) METHOD AND APPARATUS FOR COORDINATING SERVICES

(75) Inventors: Robert Brookes, Gibsonia, PA (US); Mark A. Homison, Glenshaw, PA (US); Lisa S. Langford, Allison Park, PA (US); James V. Latch, Gibsonia, PA (US); Thomas S. Molenda, Pittsburgh, PA (US); Christopher W. Umble, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 411 days.

(21) Appl. No.: 09/618,809

(22) Filed: Jul. 18, 2000

(65) Prior Publication Data
US 2003/0014295 A1 Jan. 16, 2003

Related U.S. Application Data
(60) Provisional application No. 60/146,039, filed on Jul. 28, 1999.

(51) Int. Cl.$^7$ .................................................. G06F 17/60
(52) U.S. Cl. ................................................ 705/7; 705/8; 705/9
(58) Field of Search ........................... 705/7, 8, 9, 10, 705/4, 14, 1, 5; 395/202, 329; 707/660; 380/25

(56) References Cited

U.S. PATENT DOCUMENTS

| | | | |
|---|---|---|---|
| 5,432,904 A | 7/1995 | Wong | 395/161 |
| 5,504,674 A | 4/1996 | Chen et al. | 364/401 |
| 5,583,763 A * | 12/1996 | Atcheson et al. | 707/3 |
| 5,652,842 A * | 7/1997 | Siegrist et al. | 705/2 |
| 5,794,207 A | 8/1998 | Walker et al. | 705/23 |
| 5,797,127 A | 8/1998 | Walker et al. | 705/5 |
| 5,842,178 A * | 11/1998 | Giovannoli | 705/26 |
| 5,862,223 A | 1/1999 | Walker et al. | 380/25 |
| 5,884,272 A | 3/1999 | Walker et al. | 705/1 |
| 5,950,169 A * | 9/1999 | Borghesi et al. | 705/4 |
| 6,282,251 B1 * | 8/2001 | Worstell | 375/341 |
| 6,314,406 B1 * | 11/2001 | O'Hagan et al. | 705/14 |
| 6,356,909 B1 | 3/2002 | Spencer | 707/10 |
| 6,397,197 B1 * | 5/2002 | Gindlesperger | 705/37 |

FOREIGN PATENT DOCUMENTS

| | | | |
|---|---|---|---|
| WO | WO 9526535 A1 * | 10/1995 | G06F/17/60 |
| WO | WO00072207 A1 * | 11/2000 | G06F/17/60 |

OTHER PUBLICATIONS

Corporate News "PPG Receives CIO Award For IT Application In Forming Business" discloses a consumer resolving a glass replacement or repair claim with a brief telephone call.*
Kalakota, Ravi and Whinston, Andrew B, "Electronic Commerce A Manager's Guide", published in 1997.*
www.safelite.com as archived Jun. 20, 2003—Windshield glass replacement service.*
cartalk.cars.com as archived on Jul. 7, 2000—Web site on automobile repairs.*

* cited by examiner

Primary Examiner—Romain Jeanty
(74) Attorney, Agent, or Firm—Dennis G. Millman

(57) ABSTRACT

The invention relates to a method of coordinating or arranging services, such as automotive glass repair services for the policyholders of an insurance company, and to an apparatus for practicing the method. The method includes providing a database of service providers, obtaining service need information regarding a customer, selecting at least a portion of the service providers in the database based on the service need information, ranking the selected service providers, and choosing one of the ranked service providers to perform the service.

6 Claims, 5 Drawing Sheets

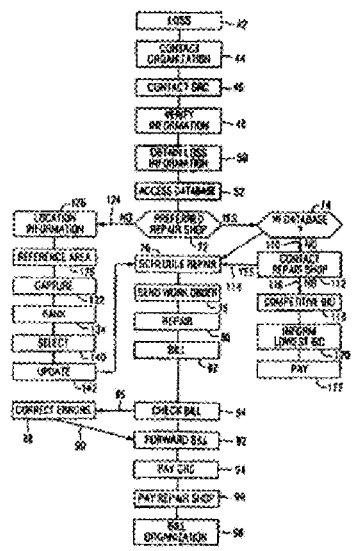

UNITED STATES PATENT AND TRADEMARK OFFICE
CERTIFICATE OF CORRECTION

| | |
|---|---|
| PATENT NO. | : 6,950,801 B2 |
| APPLICATION NO. | : 09/618809 |
| DATED | : September 27, 2005 |
| INVENTOR(S) | : R. Brookes et al. |

It is certified that error appears in the above-identified patent and that said Letters Patent is hereby corrected as shown below:

Please delete old existing Drawing sheets and insert these new drawings.

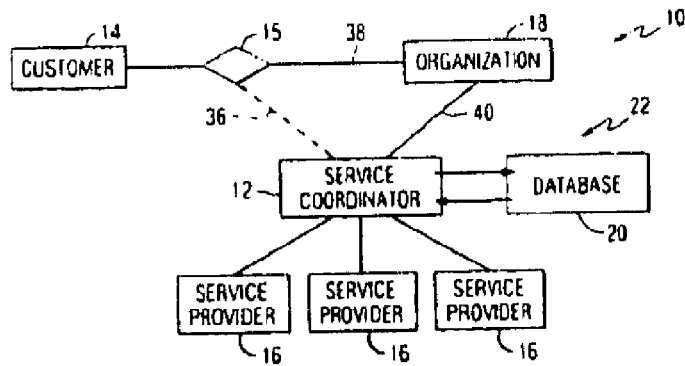

FIG. 1

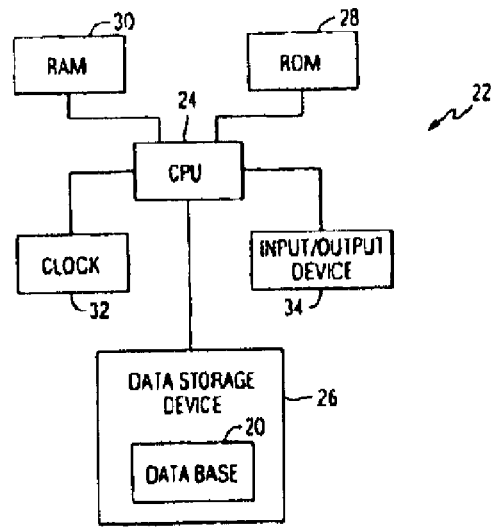

FIG. 2

UNITED STATES PATENT AND TRADEMARK OFFICE
CERTIFICATE OF CORRECTION

PATENT NO. : 6,950,801 B2  Page 4 of 6
APPLICATION NO. : 09/618809
DATED : September 27, 2005
INVENTOR(S) : R. Brookes et al.

It is certified that error appears in the above-identified patent and that said Letters Patent is hereby corrected as shown below:

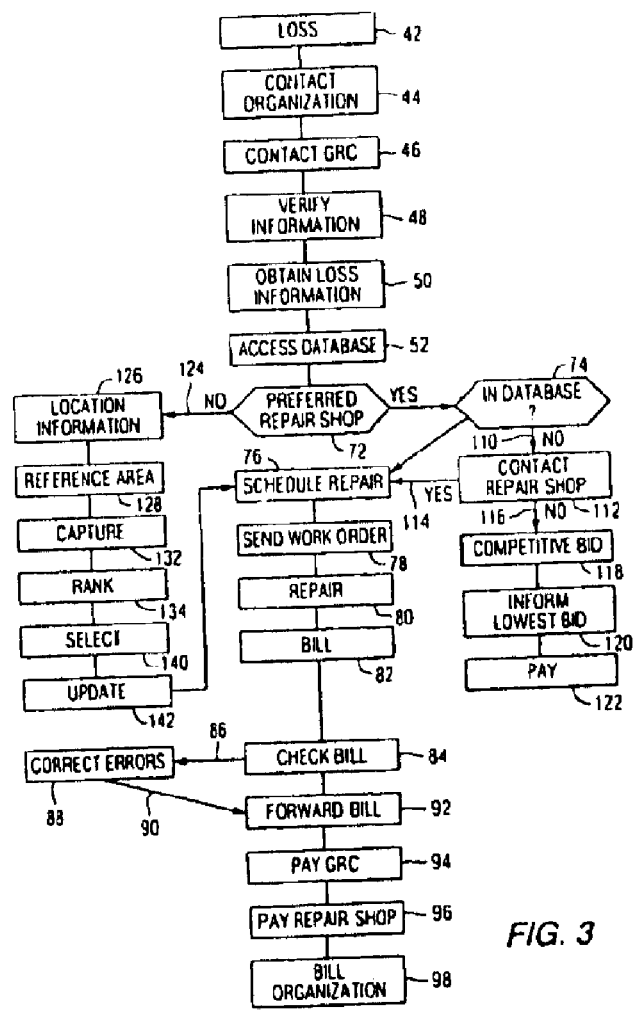

FIG. 3

UNITED STATES PATENT AND TRADEMARK OFFICE
CERTIFICATE OF CORRECTION

PATENT NO. : 6,950,801 B2  Page 5 of 6
APPLICATION NO. : 09/618809
DATED : September 27, 2005
INVENTOR(S) : R. Brookes et al.

It is certified that error appears in the above-identified patent and that said Letters Patent is hereby corrected as shown below:

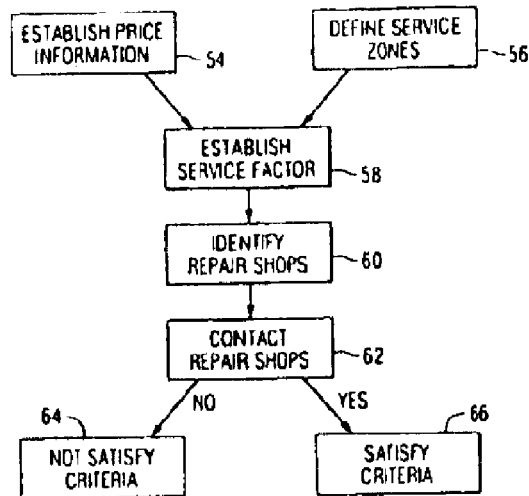

*FIG. 4*

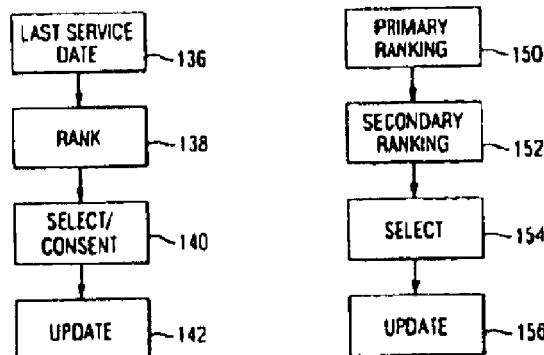

*FIG. 5*      *FIG. 6*

UNITED STATES PATENT AND TRADEMARK OFFICE
CERTIFICATE OF CORRECTION

PATENT NO.        : 6,950,801 B2                                            Page 6 of 6
APPLICATION NO.   : 09/618809
DATED             : September 27, 2005
INVENTOR(S)       : R. Brookes et al.

It is certified that error appears in the above-identified patent and that said Letters Patent is hereby corrected as shown below:

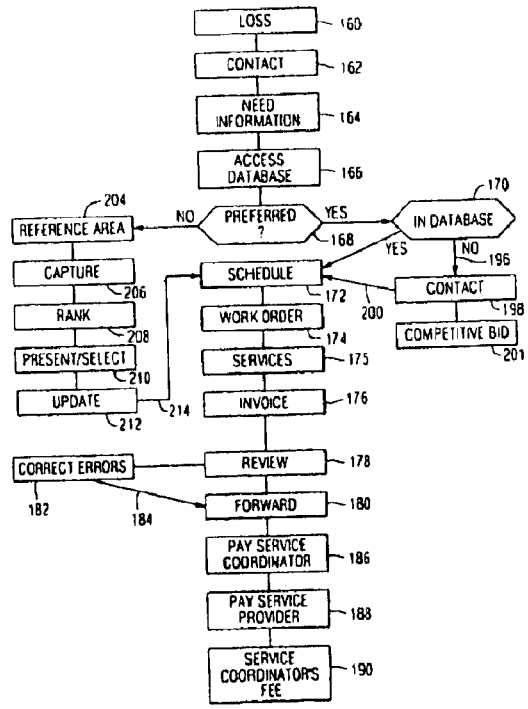

FIG. 7

This certificate supersedes the Certificate of Correction issued June 10, 2008.

Signed and Sealed this

Fifteenth Day of July, 2008

JON W. DUDAS
*Director of the United States Patent and Trademark Office*